US 8,966,328 B2

(12) United States Patent  (10) Patent No.: US 8,966,328 B2
Collins  (45) Date of Patent: Feb. 24, 2015

(54) DETECTING A MEMORY DEVICE DEFECT

(71) Applicant: Hewlett-Packard Development Company, L.P., Houston, TX (US)

(72) Inventor: David Collins, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 55 days.

(21) Appl. No.: 13/716,992

(22) Filed: Dec. 17, 2012

(65) Prior Publication Data

US 2014/0173368 A1  Jun. 19, 2014

(51) Int. Cl.
*G06F 11/08* (2006.01)
*G06F 11/34* (2006.01)
*G06F 11/24* (2006.01)

(52) U.S. Cl.
CPC .................................. *G06F 11/3409* (2013.01)
USPC .......................................... 714/706; 714/718

(58) Field of Classification Search
CPC .............. G06F 11/076; G06F 11/1008; G06F 11/1068; G06F 11/10; G06F 11/0793; H04L 1/20; H04L 1/24; H04L 1/0057; H04L 1/0045; G11C 29/56; G11C 29/40; G11C 29/44; G11C 2029/0411; G11B 20/18
See application file for complete search history.

(56) References Cited

U.S. PATENT DOCUMENTS

| 4,479,214 | A  | * | 10/1984 | Ryan .............................. 714/702 |
| 6,044,019 | A  |   | 3/2000  | Cernea et al. |
| 6,560,725 | B1 | * | 5/2003  | Longwell et al. ............... 714/54 |
| 6,717,986 | B1 | * | 4/2004  | Ueno ............................ 375/233 |
| 7,447,957 | B1 |   | 11/2008 | Cooley et al. |
| 7,839,729 | B2 |   | 11/2010 | Kadlec |
| 2003/0198165 | A1 | * | 10/2003 | Mouri et al. ................ 369/53.35 |
| 2004/0103350 | A1 | * | 5/2004  | Pham ........................... 714/704 |
| 2008/0052721 | A1 | * | 2/2008  | Rangarajan et al. .......... 718/105 |
| 2009/0251816 | A1 | * | 10/2009 | Kikuchi ......................... 360/31 |
| 2011/0158426 | A1 | * | 6/2011  | Matsuo .......................... 381/92 |
| 2012/0331345 | A1 | * | 12/2012 | Tan et al. ....................... 714/32 |

OTHER PUBLICATIONS

Ashouei, M., et al. "Probabilistic Compensation for Digital Filters Under Pervasive Noise-Induced Operator Errors," School of Electrical and Computer Engineering Georgia Institute of Technology, Atlanta, GA 30302, 2007.

* cited by examiner

*Primary Examiner* — April Y Blair
*Assistant Examiner* — Dipakkumar Gandhi
(74) *Attorney, Agent, or Firm* — Trop, Pruner & Hu, P.C.

(57) ABSTRACT

A technique includes receiving data indicative of a time varying count of errors, which are attributable to at least one memory device. The technique includes filtering the indicated count and detecting a defect in the memory device(s), where the detecting includes selectively generating an indicator to represent that the memory device(s) is defective based at least in part on a result of the filtering.

20 Claims, 4 Drawing Sheets

DETECTING A MEMORY DEVICE DEFECT

BACKGROUND

Contemporary server platforms incorporate reliability, availability and serviceability (RAS) system memory features for purposes of alerting customers when a memory device's functionality has entered a degraded state, but the memory device is still operational. The RAS features typically attempt to identify whether the memory device errors are correctable or uncorrectable. This pre-failure warning information provides the customer an opportunity to schedule maintenance activities prior to the identified memory device becoming non-operational to prevent a system crash.

DETAILED DESCRIPTION

Techniques and systems are disclosed herein for purposes of detecting or determining when a given memory device (a dual inline memory module (DIMM), for example) has caused a correctable, defective error due to a degraded state of the memory device so that timely corrective action (a maintenance activity, for example) may be taken while the device is still operational. In this manner, a "correctable error" refers to an error in a unit of stored data for which sufficient information exists (error code correction (ECC) bits, for example) to restore the data unit. Not all correctable memory errors are introduced by defects in memory devices, however. Therefore, detecting a defective memory device may be challenging due to correctable memory errors being caused by any one of a number of potential error sources other than memory device defects.

More specifically, a given memory error may be due to a particular defect with a memory device, such as a DIMM having a defective cell, column or row. However, the correctable memory error may be due to a random error source and such errors may obscure identifying defective memory devices, if not for the systems and techniques that are disclosed herein. Such random noise sources may be attributable atmospheric or terrestrial radiation; process errors (contamination due to manufacturing processes, for example); memory channel noise (noise due to the lack of signal integrity, for example); memory channel hardware interfaces (intermittent connections, for example); transient errors (power rail fluctuations, for example); and the memory technology in general (DIMM technology in which higher clock rates result in a lower signal-to-noise ratio (SNR), for example).

One way to monitor for defective memory devices is to count the number of correctable errors in data retrieved from the devices. For example, a computer system may include rank counters, where each rank counter is associated with a particular memory device (a particular DIMM, for example) or group of memory devices. When a correctable memory error is detected, the computer system may increment the associated rank counter so that the computer system's firmware may periodically or intermittently read (and subsequently reset) the count values of these counters to track error rates of the memory devices. Thus, in theory, a defective memory device may be identified when its associated error rate (as indicated by its counter) exceeds a threshold.

Challenges with this approach, however, are that some error sources are due to effects other than memory device defects, such as the random noise source effects that are listed above. In accordance with the systems and techniques that are disclosed herein, however, the rank error count values are filtered for purposes of suppressing random noise-related memory errors to focus on memory device defects.

Figure 1:
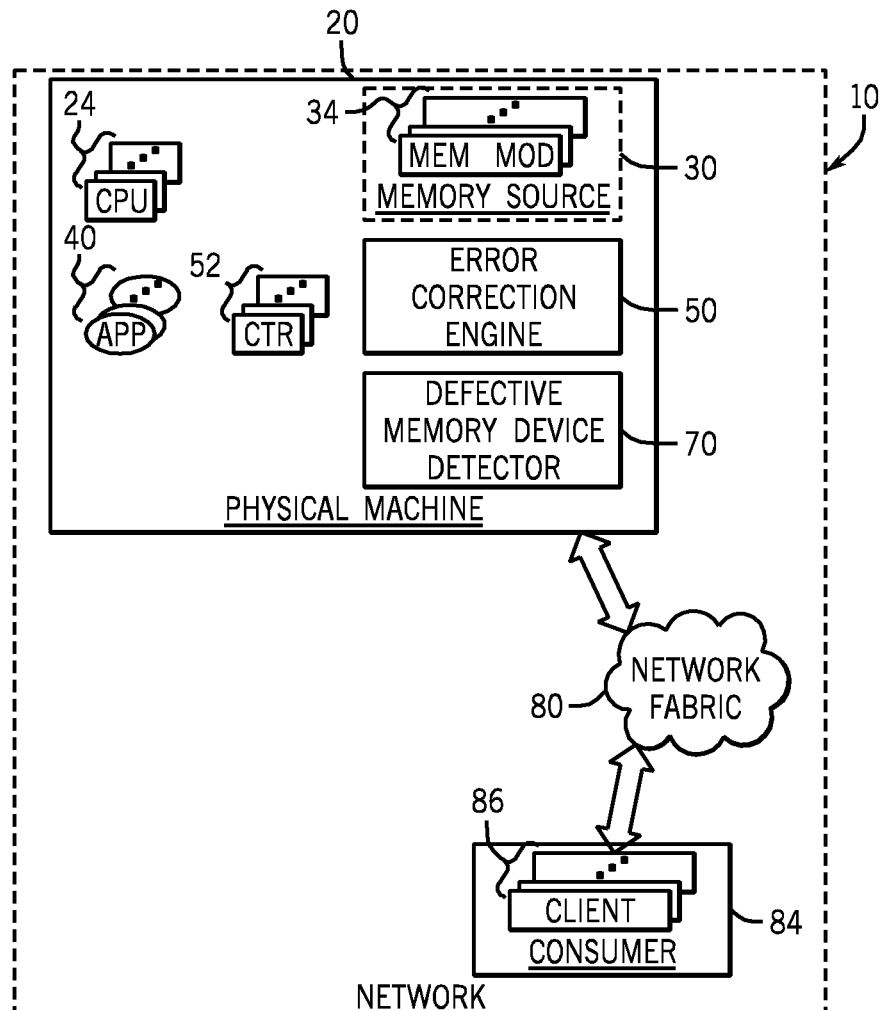
FIG. 1 is a schematic diagram of a network according to an example implementation.

As a more specific example, FIG. 1 depicts a network 10 in accordance with an example implementation. The network 10 includes a physical machine 20, which is an actual machine made up of actual hardware and actual software. In this regard, for the depicted example, the physical machine 20 includes one or more central processing units (CPUs) 24 and a memory source 30. The memory source 30 may be a system memory for the physical machine 20 in accordance with an example implementation and may include one or multiple memory modules 34 (DIMMs, for example).

In general, the memory source 30 stores program data and program instruction data, which are processed by the CPU(s) 24. In this regard, the CPU(s) 24 may execute program instructions stored in the memory source 30 for purposes of forming various software components for the physical machine 20, such as an operating system, device drivers, utilities, applications 40 and so forth. In general, the memory source 30 may be formed from non-transitory storage devices, such as semiconductor storage devices, magnetic memory-based storage devices, optical-based storage devices or a combination of such devices, as examples.

The physical machine 20 may be, in accordance with an example implementation, a server that is coupled to the network 10 via network fabric 80. In general, however, the physical machine 20 may be a portable computer, an ultrabook computer, a tablet computer, a desktop computer, a client, a server, a smartphone, and so forth, depending on the particular implementation. The network fabric 80 may include Internet-based fabric, local area network (LAN)-based fabric, routers, switches, gateways, and so forth.

For the example implementation that is depicted in FIG. 1, the physical machine 20 is coupled to one or multiple clients 86 through the network fabric 80. In general, the client(s) 86 form a consumer 84 for the data that is supplied by the physical machine 20. In this manner, the consumer 84 interacts with the physical machine 20 to store data in and retrieve data from the memory source 30.

The physical machine 20 includes various components that may be hardware, software or a combination of hardware and software, which perform correctable memory error monitoring and correction for the physical machine 20. In this regard, the physical machine 20 may include an error correction engine 50, which monitors data read from the memory source 30 for purposes of detecting errors in the read data. As an example, in accordance with some implementations, the error correction engine 50 may apply error code correction (ECC)-based detection for purposes of using ECC bits of data retrieved from the memory source 30 for purposes of detecting errors in this data.

It is noted that the error correction engine 50 may use ECC-based correction for purposes of using the ECC bits to correct the data (when correctable) so that error corrected data may be supplied to the consumer 84. Depending on the particular implementation, the error correction engine 50 may be formed in hardware and/or software. The error correction engine 50 may be part of a memory controller of the physical machine 20, in accordance with an example implementation.

In response to detecting a correctable error occurring with data retrieved from a particular memory module 34 of the memory source 30, the error correction engine 50 increments an associated rank counter 52 of the physical machine 20. The physical machine 20 may have many such rank counters 52, as depicted in FIG. 1, in accordance with example implementations. In this manner, each rank counter 52 may be associated with one or more of the memory modules 34, and each rank counter 52 maintains an error count that may be used to track the rates at which correctable errors occur with the associated memory module(s) 34.

In general, a defective memory device detector 70 of the physical machine 20 monitors the count values stored by the rank counters 52 and manages the resetting of these count values for purposes of 1.) detecting memory devices with defects and 2.) determining when to generate the appropriate alarm signals so that appropriate corrective action may be taken. This corrective action may, for example, involve scheduling the appropriate maintenance activities prior to the defective memory module(s) 34 becoming non-operational. Depending on the particular implementation, the defective memory device detector 70 may be formed entirely out of hardware; may be formed by the CPU(s) 24 executing machine executable instructions (a firmware or basic input/output system routine, for example); may be formed from a combination of hardware and software; and so forth.

One way for the defective memory device detector 70 to detect defective memory modules 34 is for the detector 70 to periodically sample and reset the count values provided by the rank counters 52 to monitor ongoing rates of errors associated with the memory modules 34. However, such "raw" count values form relatively inaccurate indicators for detecting memory device defects due to potential random noise sources significantly influencing the count values and thus, obscuring the error counts that are attributable to memory device defects. In accordance with the systems and techniques that are disclosed herein, the defective memory device detector 70 filters the sampled rank count values for purposes of discriminating between errors due to memory device defects and errors attributable to other error sources.

Figure 2:
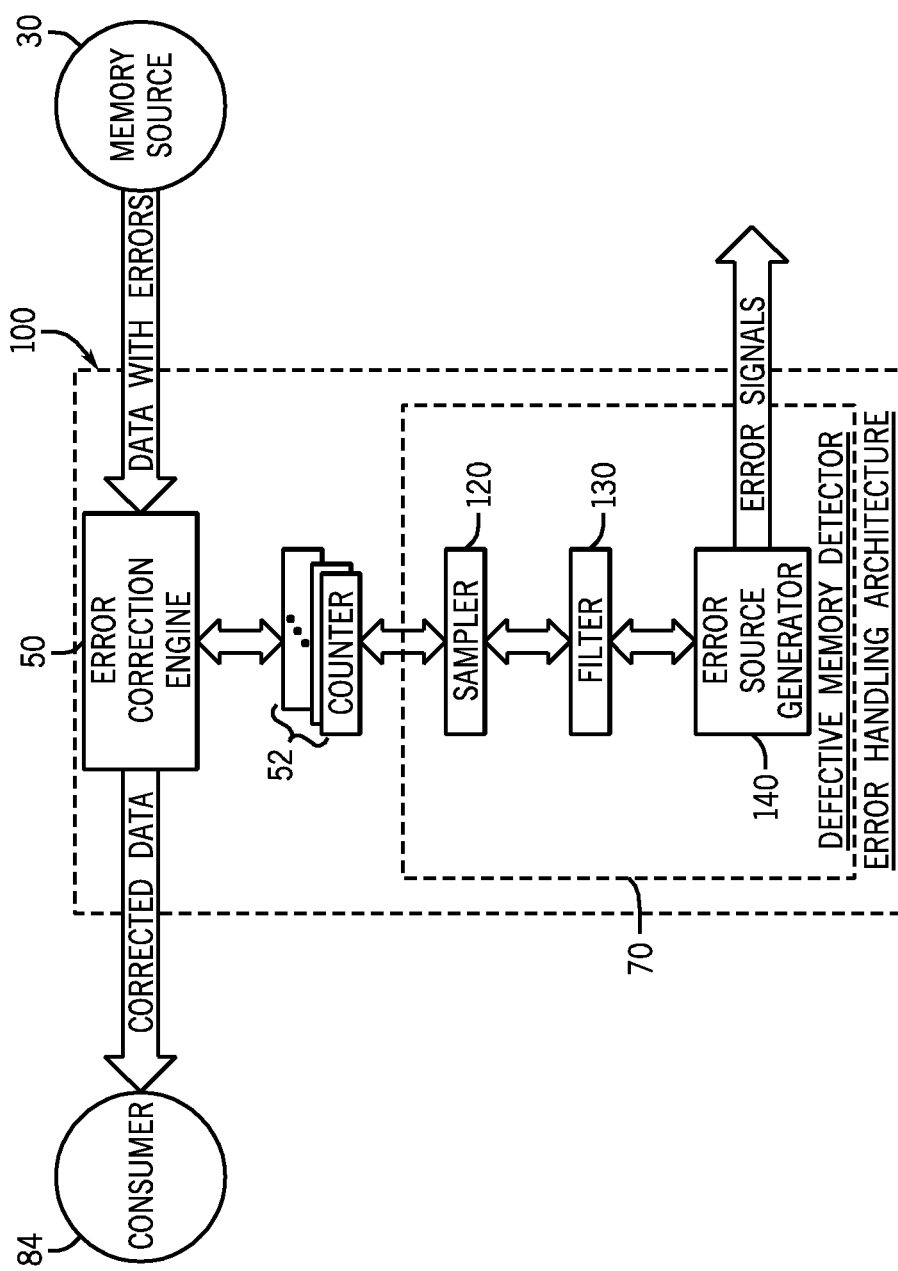
FIG. 2 is a schematic diagram of an error handling architecture of a physical machine of the network of FIG. 1 according to an example implementation.

More specifically, referring to FIG. 2 in conjunction with FIG. 1, in accordance with an example implementation, the physical machine 20 may employ an error handling architecture 100, in which the error correction engine 50 receives data from the memory source 30. Some of this retrieved data may contains errors, and for the correctable errors, the error correction engine 50 provides corresponding corrected data to the consumer 84.

In response to the error correction engine 50 detecting a correctable error, the error correction engine 50 logs the associated error by incrementing the appropriate rank counter 52. In this regard, in accordance with example implementations, each of the counters 52 is associated with one or more memory devices such that when the error correction engine 50 detects an error, the error correction engine 50 increments the corresponding rank counter 52. It is noted that many variations are possible, in that, in accordance with other implementations, the error correction engine 50 may decrement a given counter 52 in response to the detection of an error.

For the depicted example implementation, the defective memory detector 70 includes a sampler 120, which intermittently samples count values provided by the rank counters 52. In this regard, in accordance with example implementations, a periodic scalable memory interface (SMI) interrupt signal may be used to trigger the sampler's sampling of the rank count values. Upon sampling a given rank count value, the defective memory detector 70 resets the corresponding rank counter 54 so that the next count value sampled from the counter 54 reflects the errors that occur during the next sampling period.

As depicted in FIG. 2, the defective memory detector 70 includes a filter 130 that mitigates the effects of random noise (i.e., filters out error counts introduced by non-memory device defect sources) and provides enhanced control with identifying memory device defects. More specifically, referring to FIG. 3 in conjunction with FIG. 2, in an exemplary illustration 200, a raw count value 204 for a given rank counter 52 may vary about a correctable error threshold 212. The raw count value 204, however, may be due in part to counts caused by random noise sources, and as such, merely comparing the raw count value 204 to the correctable error threshold 212 may not produce satisfactory results.

Figure 3:
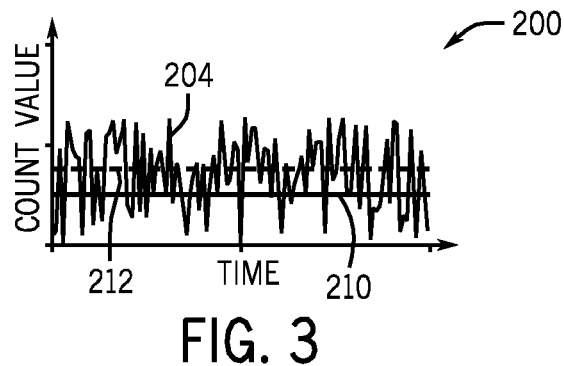
FIG. 3 is an illustration of an error count value for a memory device according to an example implementation.
Figure 4:
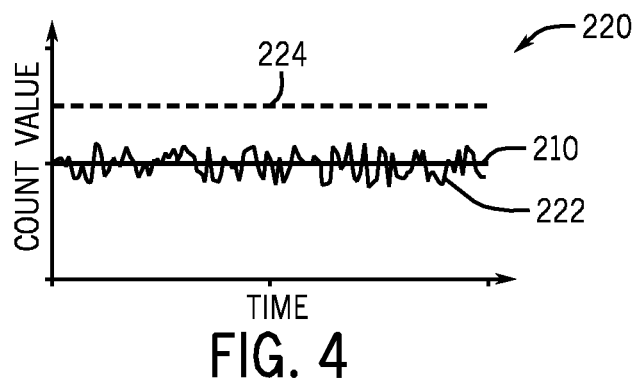
FIG. 4 is an illustration of a filtered error count value for the memory device according to an example implementation.

As also illustrated in FIG. 3, the average number of correctable memory errors due to memory device defects is represented by another threshold 210, which is lower than the threshold 212. Referring to FIG. 4 in conjunction with FIG. 2, with the use of the filter 130 (as depicted in illustration 220 of FIG. 4), however, a filtered count value 222 (provided by the filter 130) has a significantly reduced amplitude or magnitude (as compared to the raw count value of FIG. 3) due to the suppression of the random noise. As depicted in FIG. 4, the filtered count value 222 is relatively tightly centered about the average correctable memory device error threshold 210, so that when a given memory device is about to fail, the filtered count value 222 reaching or exceeding a correctable error threshold 224 may be used as a reliable indicator of a memory device defect.

Thus, due to the above-described filtering noise-induced errors are significantly attenuated below the correctable error threshold 224 selected for the platform RAS policy and is a direct consequence of the filtered bandwidth. Moreover, for example implementations in which the filter 130 is a digital filter, the sampling nature inherent in the design of the filter 130 allows for enhanced control of error signaling because the error threshold is constructed to be exceeded over multiple samples in order to qualify as a true error, which results in an improved overall measurement transient response.

In accordance with an example implementation, the filter 130 may be a finite impulse response (FIR) filter, although other digital and/or analog filters may be used, in accordance with further implementations. As a further example, the filter 130 may be a low pass filter, in accordance with example implementations, although other filter responses (a bandpass filter or a notch filter, as examples) other than the low pass response, may be used, in accordance with further implementations. As a more specific example, in accordance with some implementations, the filter 130 may be a moving average, low pass FIR filter. The error source generator 140 (see FIG. 2) compares the filter count values provided by the filter 130, compares the count values to a selected RAS policy threshold and generates the appropriate error signals when the threshold 224 (see FIG. 4) is reached and/or exceeded.

As a more specific example, in accordance with some implementations, the rank counters 52 may be eight bit counters, storing count values of up to 255 ($2^8$). The number of samples and the accumulator size used by the filter 130 (as further described herein) effectively increase the counter range. In accordance with some implementations, the accumulator may capture four samples and have a size of 16 bits. Consequently, the effective error counter range is 4*255=1020. Averaging the accumulated error count suppresses the effective noise of the noise power spectral density.

Figure 5:
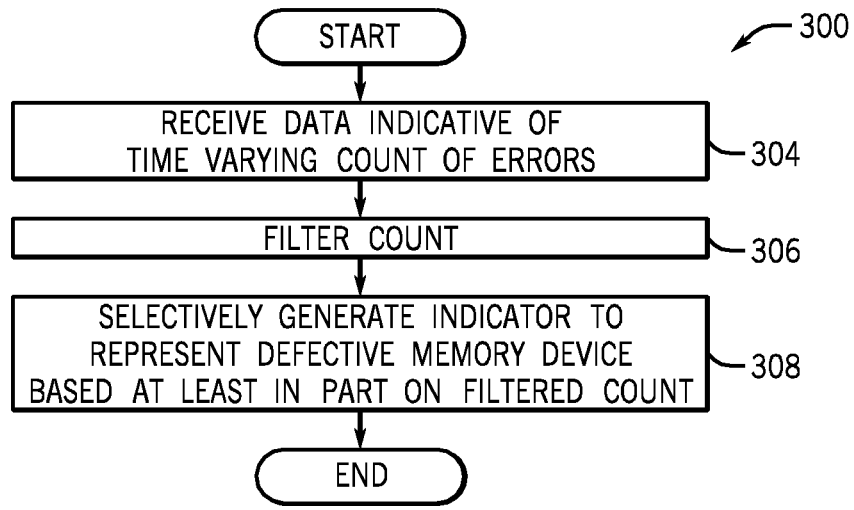
FIGS. 5 and 6 are flow diagrams depicting techniques to detect a defective memory device according to example implementations.

Thus, to summarize, in accordance with example implementations, a technique 300 that is depicted in FIG. 5 includes receiving (block 304) data indicative of a time varying counter of errors and filtering (block 306) the count. An indicator is selectively generated, pursuant to block 308, to represent a defective memory device based at least in part on the filtered count.

Figure 6:
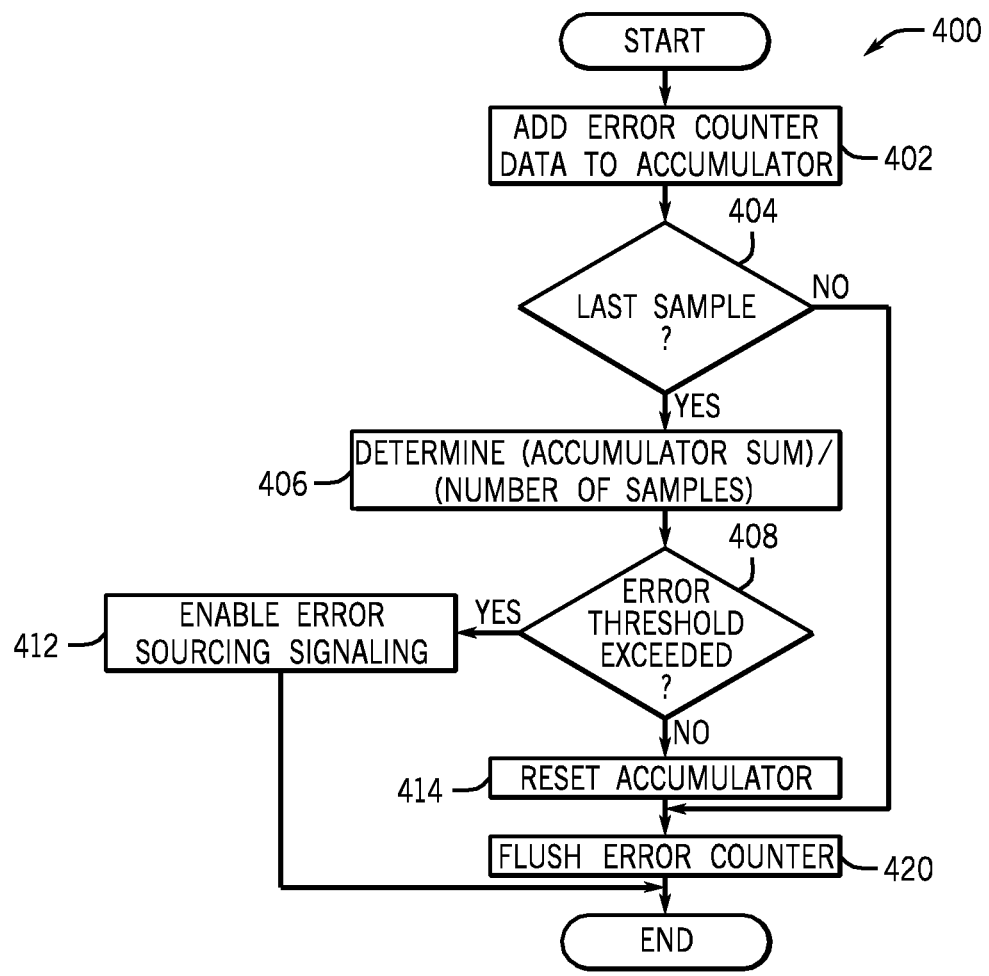

As a more specific example, FIG. 6 depicts an exemplary technique 400 for selectively generating error signals indicating correctable errors due to memory device defects. It is noted that the technique 400 may be, for example, a routine (a firmware or basic input/output system (BIOS) routine, for example) that is periodically executed by the physical machine 20 or executed to service an interrupt.

Pursuant to the technique 400, error counter data is added to an accumulator, pursuant to block 402. A predetermined number of samples are accumulated (four samples, as an example); and if a determination is made (decision block 404) that the last sample to be accumulated was made, then the moving average is determined. In this regard, as depicted in FIG. 6, the technique 400 includes determining a moving average by dividing the accumulated sum by the number of samples, pursuant to block 406. Thus, the result of block 406 is a filtered count value, which is compared to a threshold to determine, pursuant to decision block 408, whether the error threshold has been exceeded. If so, then the error source signaling is enabled, pursuant to block 412. Otherwise, if the threshold is not exceeded, then the accumulator is reset (block 412) and the error counter is reset, or flushed, pursuant to block 420 before the technique 400 is terminated.

If in decision block 404 a determination is made that the last sample for the current accumulation has not been acquired, then control proceeds to block 420 where the count value is reset (i.e., the counter is flushed), pursuant to block 420, before the technique 400 terminates.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
receiving data indicative of a time varying count of errors attributable to at least one memory device;
filtering the indicated count; and
detecting a defect in the at least one memory device, the detecting comprising selectively generating an indicator to represent that the at least one memory device is defective based at least in part on a result of the filtering.

2. The method of claim 1, further comprising:
sampling a count value of an error counter associated with the at least one memory device to generate time samples of the count value, wherein the received data indicates the samples.

3. The method of claim 2, further comprising:
intermittently resetting the error counter.

4. The method of claim 2, wherein the filtering comprises accumulating the time samples.

5. The method of claim 4, further comprising:
intermittently resetting an accumulated value associated with the accumulation.

6. The method of claim 4, wherein the filtering further comprises determining an average of the time samples over a given period of time based on the accumulation of the time samples.

7. The method of claim 2, wherein the filtering comprises using the time samples to determine a filtered count value, and selectively generating the indicator comprises selectively generating the indicator based at least in part on the filtered count value.

8. The method of claim 7, further comprising:
sampling the count value of the error counter for the at least one memory device to generate other time samples of the count value, using the other time samples to determine another filtered count value and selectively generating the indicator based at least in part on the another filtered count value.

9. An apparatus comprising:
a counter to provide a time varying count of errors attributable to at least one memory device;
an error correction engine adapted to, based on data received from the at least one memory device, determine whether an error occurred attributable to the at least memory device and operate the counter in response thereto; and
a defective memory device detector comprising:
a sampler to acquire samples of the counter;
a filter to filter the samples to provide a filtered count value; and
an error source generator to detect a defect in the at least one memory device is based at least in part on the filtered count value.

10. The apparatus of claim 9, wherein the filter comprises a finite impulse response filter.

11. The apparatus of claim 9, wherein the filter comprises at least one of a low pass filter, a notch filter and a bandpass filter.

12. The apparatus of claim 9, wherein the filter is adapted to suppress signal content attributable to noise not correlated to operation of the at least one memory device.

13. The apparatus of claim 9, wherein the filter is adapted to determine a moving window average of the samples to derive the filtered count value.

14. The apparatus of claim 9, wherein the error correction engine is adapted to selectively change the count value in response to application of error correction code (ECC)-based detection to the received data.

15. The apparatus of claim 9, further comprising additional counters to provide time varying counts of errors attributable to a plurality of memory modules, wherein:
the error correction engine is further adapted to, based on data received from the plurality of memory modules determine whether errors occurred attributable to the plurality of memory modules and operate the additional counters in response thereto,
the defective memory device detector is adapted to acquire samples of the additional counters, filter the samples to provide additional filtered count values, and
the error source generator is adapted to detect a defect in the plurality of memory modules based at least in part on the additional filtered count values.

16. An article comprising a non-transitory storage medium to store instructions that when executed by a computer cause the computer to:
filter data indicative of a time varying count of errors attributable to at least one memory device; and detect a defect in the at least one memory device and selectively generate an indicator to represent the detection based at least in part on a result of the filtering.

17. The article of claim 16, the storage medium to store instructions that when executed by the computer cause the computer to sample a count value of an error counter for the at least one memory device to generate time samples of the count value.

18. The article of claim 17, the storage medium to store instructions that when executed by the computer cause the computer to intermittently reset the error counter.

19. The article of claim 17, the storage medium to store instructions that when executed by the computer cause the computer to accumulate the time samples and determine an average of the accumulated time samples to filter the samples.

20. The article of claim 17, the storage medium to store instructions that when executed by the computer cause the computer to apply a finite impulse response filter to the samples.

* * * * *